United States Patent Office.

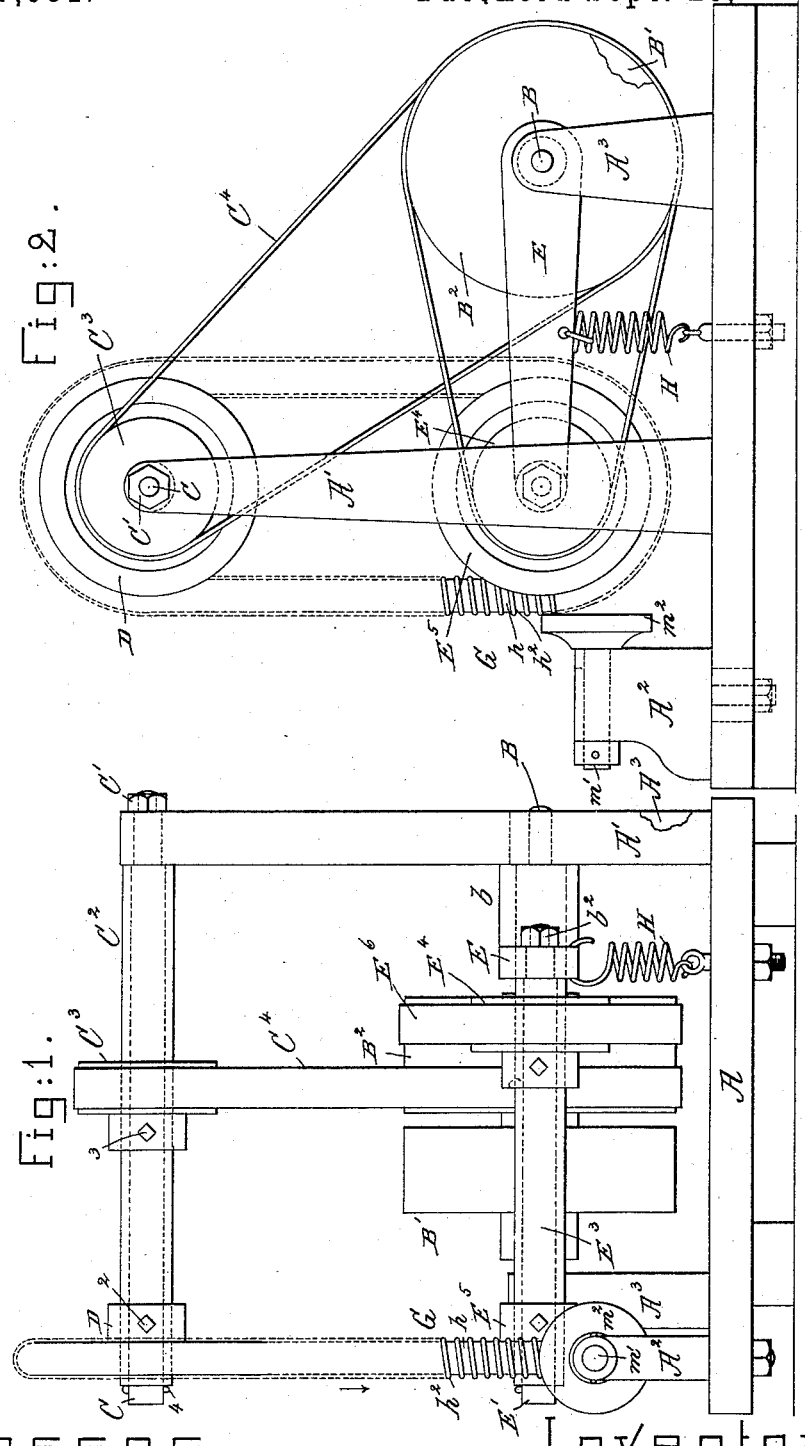

OTHNIEL GILMORE, OF NORTH RAYNHAM, MASSACHUSETTS.

CHANNEL-FLAP-LAYING MACHINE.

SPECIFICATION forming part of Letters Patent No. 327,081, dated September 29, 1885.

Application filed February 9, 1885. (No model.)

*To all whom it may concern:*

Be it known that I, OTHNIEL GILMORE, of North Raynham, county of Bristol, State of Massachusetts, have invented an Improvement in Channel-Flap-Laying Mechanism, of which the following description, in connection with the accompanying drawings, is a specification, like letters on the drawings representing like parts.

This invention is an improvement on that class of machines represented in my Patent No. 310,668, dated January 13, 1885, wherein the wire-like or corrugated rubbing-surface is attached to a metal ring or shell and is truly circular.

In accordance with my present invention the annular coils or rings of wire or metallic projections are applied to a flexible core, which may be of rope, leather, or other flexible material, thus making an endless belt with metallic projections, the belt being adapted to be extended over driving-pulleys.

Figure 1 represents a front elevation of a machine embodying my invention, and Fig. 2 a right-hand side view thereof.

Referring to the drawings, A A' A² A³ represent rigid frame-work of suitable shape to receive and support the working parts.

The main shaft B, mounted in the frame parts A³, has fast on it a pulley, B', which receives a suitable belt (not shown) extended from a counter-shaft, by which to rotate the said shaft and a second attached pulley, B².

The frame part A' at or near the top of the machine has a long stud, C, which is held in place by a nut, C'. The stud C receives upon it the sleeve C², to which is attached the grooved wheel D and the belt-wheel C³ by the set-screws 2 3, respectively, the sleeve being retained on the stud by the pin 4, or other suitable nut or device, the sleeve and grooved wheel being rotated by the belt C⁴, extended over the pulleys B² and C³.

The shaft B receives upon it the hub $b$ of an arm or lever, E, which at its outer end receives the stud E', held in place by the nut $b^2$, the said stud supporting the tubular or sleeve-like shaft E³, on which is secured the belt-pulley E⁴, the opposite end of the said shaft having attached to it the grooved wheel E⁵, which is of the same construction and diameter as the grooved wheel D and directly in line with it.

The sleeve and its attached wheel E⁵ are rotated by the belt E⁶.

My improved belt G is composed of a flexible core, $h$, surrounded by a spiral wire or spring, $h^2$, or it may be a series of metallic rings or projections, the surfaces of which extend outside the core $h$ and constitute rubbing-surfaces to act against the flap or lip of the channeled sole and brush or beat it down, wiping the said flap back into position to cover the stitches or the heads of the nails in the channel. The endless flexible belt having annular or other metallic projections is passed over or about the grooved wheels D E⁵, and the said belt is kept taut by the spiral spring H, attached to the lever E and to the base of the frame. The two wheels D and E⁵ are driven at the same speed and carry the flexible belt with them, and the latter is so supported as to enable any and every part of the shoe-sole to be presented to the action of the belt, all parts of the flap at the shank and along the ball being equally presentable to the belt.

The frame part A² is provided with a bearing which receives a pin or shaft, $m'$, on the end of which is mounted the roller $m^2$, which may be used as a gage against which to hold the edge of the sole while presenting the bottom of the sole to the action of the belt. The gage also acts to support the edge of the sole and prevent the said edge from being defaced or bruised by the projections of the belt.

I claim—

1. In a channel-flap-laying machine, the belt composed of the flexible core provided externally with metal rings or projections, substantially as described.

2. The belt composed of the flexible core provided externally with the metal projections, combined with the pulleys to carry the said belt and with means, substantially as described, to rotate the pulleys.

In testimony whereof I have signed my name to this specification in the presence of two subscribing witnesses.

OTHNIEL GILMORE.

Witnesses:
 B. J. NOYES,
 F. CUTTER.